United States Patent [19]

Kinker et al.

[11] 3,943,335

[45] Mar. 9, 1976

[54] AUTOMATIC BANKING EQUIPMENT

[75] Inventors: Donald E. Kinker; Herbert Morello, both of North Canton, Ohio

[73] Assignee: Diebold, Incorporated, Canton, Ohio

[22] Filed: Sept. 3, 1974

[21] Appl. No.: 502,898

[52] U.S. Cl. .............. 235/61.7 B; 35/48 R; 35/9 B; 340/149 A

[51] Int. Cl.².... G09B 3/02; G09B 7/02; G06K 7/10

[58] Field of Search ........... 178/518 R, 618; 35/9 B, 35/9 C, 9 D, 48 R, 48 B; 235/61.7 B, 61.11 E, 61.11 D, 61.6 R; 250/568, 569, 570; 340/149 A

[56] References Cited

UNITED STATES PATENTS

| | | | |
|---|---|---|---|
| 3,641,497 | 2/1972 | Constable | 340/149 A |
| 3,697,729 | 10/1972 | Edwards | 235/61.7 B |
| 3,728,480 | 4/1973 | Baer | 178/6.8 |
| 3,760,158 | 9/1973 | Whitehead | 235/61.6 R |
| 3,761,877 | 9/1973 | Fernald | 35/9 C |
| 3,774,316 | 11/1973 | Meier | 35/9 B |
| 3,832,790 | 9/1974 | Fryer | 35/48 R |
| 3,845,277 | 10/1974 | Voss | 235/61.7 B |

*Primary Examiner*—Daryl W. Cook
*Assistant Examiner*—Robert M. Kilgore
*Attorney, Agent, or Firm*—Frease & Bishop

[57] ABSTRACT

Automatic banking system equipment which presents at a remote customer station a unit enabling a customer to carry out any one of a number of banking services, such as depositing, making payments of various types, transferring funds between accounts, or withdrawing cash. The equipment has programmable display means to instruct the customer as to the steps or procedure to be followed in completing a selected banking transaction; also, manual entry keyboard means in which the customer makes various data entries according to the programmable display instructions to enable verification of identity and authorization of procedure through coded means presented by the customer at the remote unit to activate the equipment, and to indicate, for example, the amount of money to be withdrawn or details concerning any other banking transaction; and, also, cash dispensing and delivery mechanism activated by the keyboard means in accordance with instructions given at the programmable display means following verification that the coded means presented is valid and genuine, is presented by an authorized individual, and that the banking transaction may be completed.

8 Claims, 11 Drawing Figures

AUTOMATIC BANKING EQUIPMENT

BACKGROUND OF THE INVENTION

1. Field of the Invention

The invention relates to total automatic banking systems equipment which enable a diversity of banking functions to be carried out at a remote customer station by a bank customer in accordance with instructions given at the customer station unit which the customer must follow for any particular banking function. Such banking functions may include accepting deposits, dispensing cash, transferring funds from one account to another, or the making of payments of credit card, utility, or other accounts, or on mortgage or installment loans, or the like.

Further, the invention relates to automatic banking equipment energized by a coded credit card-type card or other coded means after card or coded means verification following entry of the card through gate means which insures proper presentation of a genuine card for verification, or entry of other coded data to the equipment.

Further, the invention relates to automatic banking equipment in which cash, usually in the form of paper money bills, in carrying out a cash dispensing operation, is delivered from a cash dispenser unit to a cash drawer which provides maximum security against attack and has a large delivery pocket to provide maximum accessibility when opened, yet protecting the contents of the open pocket against air currents, etc. when opened for removal of the cash by the customer.

2. Description of the Prior Art

Prior automatic banking equipment units for use of a customer at a remote station to carry out a number of different banking transactions without the presence of a teller, have included various combinations of components housed at or within a safe-like enclosure which housed components have included keyboards, a card entry slot, a card reader, a cash delivery drawer, a cash containing and dispensing mechanism, and a panel where messages have been displayed for directing the customer in steps that should be taken for the particular transaction.

The manual entry keyboards that have been used have been of various types and constructions, such as a touch-tone type of keyboard, push button keyboards, mechanical switch-actuating keyboards, and keyboards having lighted buttons, electric-eye keyboards, etc. The keys in any instance should be jam-proof, vandal-proof where possible, and unaffected by environmental changes to the extent possible, as well as easy to operate.

Prior message panels have included a panel displaying chronologically-arranged permanently displayed statements indicating the steps to be taken in using the equipment. The permanent display normally is located at or near the facia for the equipment adjacent the keyboard. Another prior type of message panel has involved a lighted panel wherein a fixed series of messages is displayed one or more after another successively following the successive keying in of data at the keyboard. In either instance, prior devices have not provided means to display any one of a series of messages in which any series can be changed, can be bilingual, and can present any desired programmed series of messages for any one of a plurality of banking transactions to be carried out, as well as presenting other visual information, alternately or concurrently.

No prior automatic banking equipment of which we are aware has provided a programmable display panel at which programmed messages capable of being changed can be displayed, selectively, when desired, as when the equipment is used for performing a banking function; and alternately, at which display panel some other form of message may be displayed while the unit is in standby condition between several banking service operations; and in which concurrently with any display, a visual representation of keyed-in or otherwise entered data may also be displayed at the display panel.

Further, while cash dispensing mechanism is known in the art primarily for use by a teller who keys in the amount of paper money desired, which is delivered by the mechanism to the teller as in U.S. Pat. No. 3,760,158; the coordination of such mechanism, and its operation in an automatic, remote, unattended station unit, with a programmable display of directions for operation is not known as far as we are aware.

There exists a need in the field of banking services for unmanned customer service facilities remote from main banking buildings but available at all times to customers establishing authorized identity while providing maximum security for the transactions to be carried out at the remote station, which equipment may be activated by a coded credit card and then various types and kinds of information is keyed in by a customer at a manual keyboard in accordance with changeable programmable instructions displayed adjacent the keyboard, and the keyed-in data and other information is also displayed for checking, and then the cash dispensing mechanism is energized which delivers the money requested at an adjacent cash drawer for removal by the customer.

SUMMARY OF THE INVENTION

Objectives of the invention include providing new automatic banking equipment at which banking services may be carried out at unmanned remotely located customer stations activated by credit card means whose genuiness and ownership first is checked and the requested banking service authorized in connection with actuation of a cash storage and dispensing mechanism in accordance with directions given to the customer of sequential steps to be carried out by the customer at a programmable display unit for any one of a multiple group of transactions, by entries keyed in at a manual keyboard, and which entries also may be displayed at the programmable display unit; providing such automatic banking equipment in which the displayed instructions permit errors to be corrected which may be made by the customer and indicated by conjoint display of the keyboard entries adjacent the instructions, thereby enabling the customer to complete, cancel or alter the transaction through additional instructions displayed for correcting errors; providing such automatic banking equipment in which the programmable displays may be bilingual in character; providing such automatic banking equipment in which advertising or entertaining or educational displays may be shown at the programmable display panel whenever desired, or whenever the equipment is not involved in carrying out a particular banking transaction; providing such automatic banking equipment in which the output of a video tape may be displayed; providing such automatic banking equipment in which the customer's name, read from the coded card may be displayed at the programmable display panel; providing for modification of known banking or currency-dispensing devices, components or equipment, such as disclosed in U.S. Riddle et al. Pat. No. 3,513,298, Constable U.S. Pat. Nos. 3,641,497 and 3,657,521, Edwards et al. U.S. Pat. No. 3,697,729, and Barnes et al. U.S. Pat. No. 3,761,682, to incorporate the concepts of the foregoing objectives; and providing new automatic banking equipment which achieves the stated objectives in an effective and efficient manner, and which solves problems and satisfies needs existing in the field of automatic banking equipment and systems.

These and other objects and advantages may be obtained by the new automatic banking system, equipment and operations, the general nature of which may be stated as including in automatic banking equipment of a type in which coded means is used to energize a remote customer banking unit, the combination of manual entry keyboard means; programmable display means; cash storage, dispensing and delivery means; and facilities for performing at least one of the following banking operations: depositing, transferring funds from one account to another and making payments of various kinds.

BRIEF DESCRIPTION OF THE DRAWINGS

A preferred embodiment of the invention — illustrative of the best mode in which applicants have contemplated applying the principles — is set forth in the following description and shown in the drawings and is particularly and distinctly pointed out and set forth in the appended claims.

Similar numerals refer to similar parts throughout the various figures of the drawings.

DESCRIPTION OF THE PREFERRED EMBODIMENT

Figure 1:
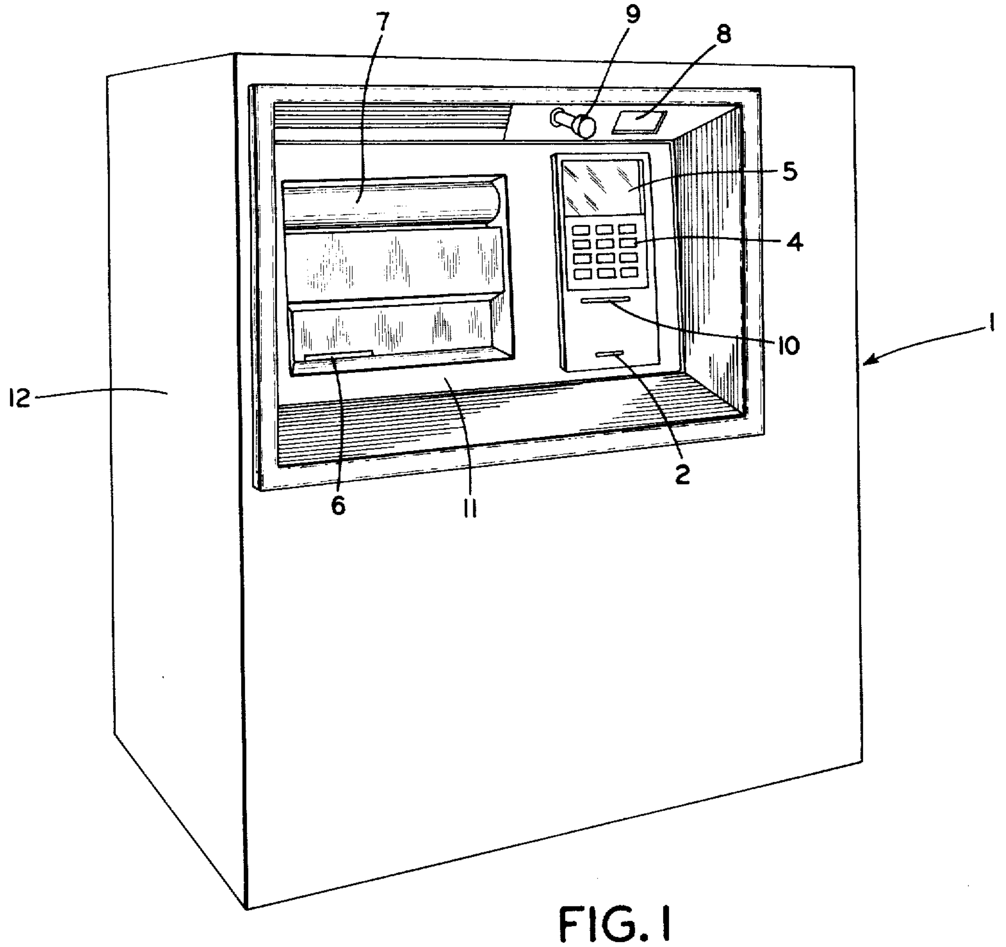
FIG. 1 is a diagrammatic perspective view of one of the improved automatic banking remote units.

A remotely located customer station automatic banking unit is indicated generally at 1 in FIG. 1. The unit 1 is a vault-like structure located at any desired unattended location convenient for offering automatic banking services at all times to authorized bank customers.

The remote unit 1 may be of the general type of automatic currency dispensers shown in any of U.S. Pat. Nos. 3,641,497, 3,657,521, 3,697,729 and 3,761,682, having an entry slot 2 for the insertion preferably of a personalized, conventional magnetic stripe plastic coded card 3 (FIGS. 2 and 3) for initiating an automatic banking transaction.

The unit 1 also is provided with a keyboard 4, the type or nature of which is described in detail below, for the entry of data and other information necessary or desired in connection with carrying out a desired banking transaction. Display panel means 5 also is provided for the unit 1 preferably located adjacent the keyboard 4 and entry slot 2, at which panel, in accordance with the invention, instructions for carrying out a selected banking operation are displayed by programmable alpha-numeric or pictorial display medii which may be bilingual, or which may be changed when desired.

The unit 1 also may have a deposit slot 6 for accepting a banking transaction deposit, and door or drawer means 7 for delivering cash, when a cash dispensing operation is carried out.

The unit 1 also, if desired, may be equipped with an audio speaker 8 and an audio microphone 9, as is usual in remote banking equipment units, where, under certain circumstances, it may be desirable to communicate with a teller located at another banking station. The unit 1 also may have a receipt slot 10 where a receipt for the transaction may be delivered to the cusomer at the completion of the banking transaction.

Other components typically housed in remote banking unit 1 include a usual card reader, not shown, which reads information from the conventional magnetic stripe coded card 3. Another and vital typical component is a cash storage, dispensing and delivery mechanism, which as indicated, typically may comprise mechanism such as shown in Cash Dispensing Apparatus U.S. Pat. No. 3,760,158, the cash delivery door or flap of which may constitute the door or drawer means indicated at 7 in the drawings.

The described entry slot 2, keyboard 4, display panel means 5, deposit slot 6, drawer means 7, speaker 8, microphone 9 and receipt slot 10 preferably are accessible to a customer at a recessed facia panel 11 in the housing 12 of the unit 1. Since the unit 1 contains a supply of cash from which currency is dispensed, and also may contain a depository receptacle into which deposits entered through deposit slot 6 are discharged, the housing 12 has protective walls forming the vault-like structure described. All of typical electronic and control equipment components for the automatic operation of the unit 1 also are contained in the housing 12.

CODED ACTUATING MEANS

Figure 2:
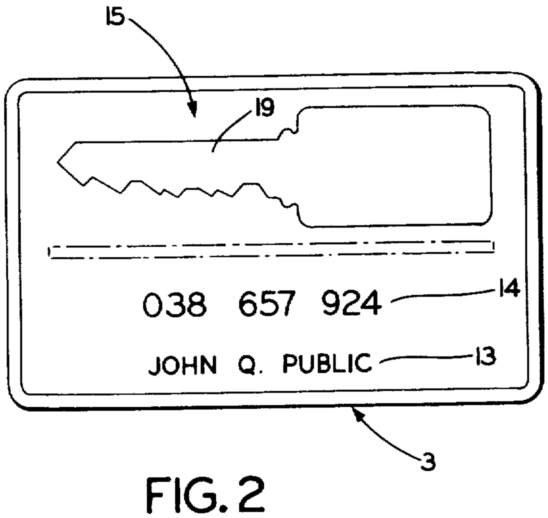
FIG. 2 is a diagrammatic view of the front of a typical coded credit card which may be used to activate the banking unit of FIG. 1.
Figure 3:
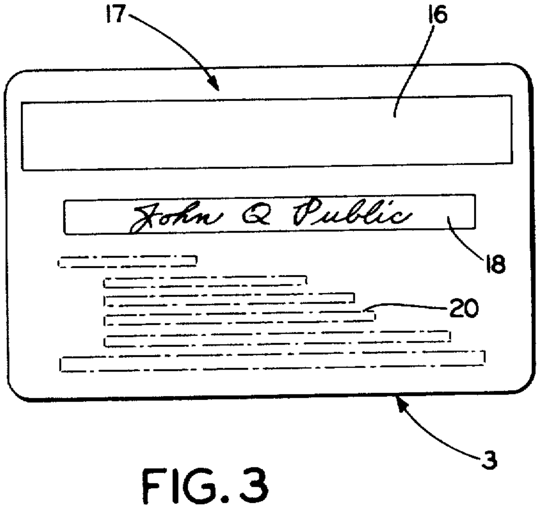
FIG. 3 is a view of the back of the coded card shown in FIG. 2.

As stated, the remote unit 1 may be of a known general type of automatic currency dispenser, such as shown in the prior patents enumerated, which unit 1 is actuated on insertion of a coded card 3. A typical coded card 3 is shown in FIGS. 2 and 3 and may be any usual or conventional type of personalized plastic credit card, for example having the customer's name 13 and account number 14 embossed on the top side 15 of the card 3. Such coded cards frequenty are used for a variety of purposes and may have data magnetically encoded thereon in one or more strips or lines at the location of the rectangular area 16 at the top of the back side 17 of the coded card 3. Another area 18 sometimes is provided where the customer's signature appears, but this is not necessary for carrying out a banking transaction.

The front side 15 of the card 3 also may contain an indicator, such as the key 19, to instruct the customer as to the direction in which the card 3 should be entered into the entry slot 2 of the remote unit 1. Other directions may, if desired, appear at 20 on the back side 17 of the card 3.

Although it has been indicated that the coded card 3 may be a usual or conventional type of personalized plastic credit card adapted for use in any of the known types of currency dispensers, it is preferred that the card 3 should be a magnetically encoded Automatic Banking System (ABS) card. Such a card may provide three or more magnetic stripes, including a first stripe for airline reservation information, and which also can include the name of the card owner. The magnetic stripes also may include a second stripe for encoding information called for by the American Bankers Association (ABA). The magnetic stripes also may include a third stripe where special information may be encoded relating to the operation of Automatic Banking System currency dispensers, etc., specifications for which have been prepared by Mutual Institutions National Transfer Systems, Inc. (MINTS) with regard to security requirements for unattended teller systems.

Normally, the operation of a remote unit 1 involves first the introduction of a valid security card such as coded card 3 into the entry slot 2 and the subsequent introduction of additional predetermined information into the unit, such as a personal identification number (PIN number) intended to be known only to the customer and memorized by the customer. When the PIN number is entered in the keyboard 4 by the customer after insertion of the coded card 3 in the entry slot 2, the card reader reads data from the card, which, along with the PIN number introduced, and other protective information which may be introduced, are checked through electronic logic to determine the validity of the card and the validity of the information. This provides a means of verifying the genuineness of the card, and the identity of the customer presenting the card, which results in authorizing the desired procedure to be carried out at the remote unit 1.

Although the operation of the remote automatic banking equipment at a unit 1 has thus far been described using a coded card 3, the operation of a remote banking unit such as the unit 1 is not dependent, in accordance with the invention, on the use of a coded credit card 3. Instead, the customer may enter his or her bank account number at the keyboard 4, followed by entry of the customer's PIN number and perhaps other required alpha-numeric data, for verification of customer identity and authorization of an automatic banking transaction at the remote unit. Such coded means comprising keyed-in information, or coded means entered in part by magnetically-encoded information on a card 3 and keyed-in information entered at the keyboard, are comprehended in referring to coded actuating means herein.

Manual Entry Keyboard Means

The manual entry keyboard means 4 may be any one of the various types and constructions heretofore used in remote banking equipment. Such means 4 should in any instance be jam-proof, vandal-proof where possible, unaffected by environmental changes to the extent possible, and easy to operate. Known types of keyboard means include touch-tone keyboards, push button keyboards, mechanical switch actuated keyboards, keyboards having lighted buttons, electric eye keyboards, etc. In accordance with the invention, the manual entry keyboard means 4 may involve the use of capacitor-type buttons which eliminate difficulties encountered in the use of other types of keyboards. Preferably, however, the keyboard means 4 may comprise a Hall-effect keyboard which involves pushing a magnet into proximity with a semiconductor which conducts or closes a circuit. An example of such keyboard means is a twelve-position keyboard such as the Current Sinking Non-Encoded Keyboard 12SW Series product of MICRO SWITCH, a Division of Honeywell.

Programmable Display Means

In accordance with the invention, the operation of the programmable display means is coordinated with and integrated with the coded actuating means, the manual entry keyboard, and the cash storage, dispensing and delivery mechanism to accomplish the multifold purposes of imparting clear and detailed instructions or directions to the customer for carrying out any one of a number of different banking transactions or precedures; of providing for changing the instructions when desired; of permitting information read by the card reader from a coded card 3 inserted into the unit 1, such as the customer's name, to be displayed at the programmable display panel; of permitting alpha-numeric data keyed into the manual entry keyboard 4 by the customer to be displayed at the display panel 5 for checking or verification by the customer, such as the amount of money desired to be withdrawn; and of displaying, in addition to alpha-numeric data, other visual information, messages, pictures or the output of video tape such as advertising or entertaining or educational material.

This concept may be implemented by modifying prior types of banking equipment to provide a video display of messages, instructions, etc. for directing the customer as to the steps to be taken to carry out a particular selected transaction, rather than the use of back lighted signs contained in prior devices; or rather than the use of chronologically arranged, permanent displayed statements, also used in prior devices.

The various messages to be displayed may be stored in a computer also contained in the housing 12. Such messages through a character generator included in the video controller are displayed at the panel 5 in a series determined in accordance with the programming of any particular banking transaction to be carried out. The computer is programmed to supply input to the character generator of the controller of the series of messages to be displayed at the panel 5. The controller and its character generator in the unit 1 may function or operate in a manner such as set forth, for example, in U.S. Pat. No. 3,772,676. The video controller may, for example, comprise a Model 204RO Video Terminal Controller, sold by Ann Arbor Terminals, Incorporated, of Ann Arbor, Michigan.

Figure 4:
FIGS. 4–9 illustrate a series of typical messages that may be programmed for display at the programmable display panel to direct the customer as to the steps to be taken to perform a selected banking function.

A typical video message displayed at panel 5 is shown in FIG. 4 which may be continuously displayed until a customer desired to carry out a banking transaction. When the customer inserts his coded card 3 in entry slot 2, the next message displayed may be that shown in FIG. 5.

Figure 5:
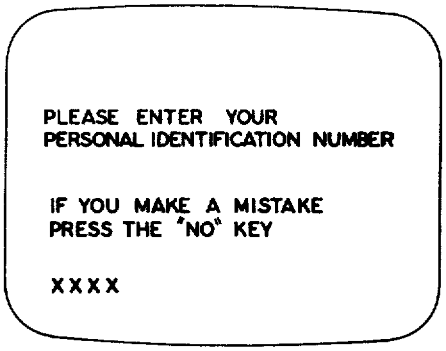

In accordance with the instructions, the customer then keys in his PIN number which also is indicated as a part of the message of FIG. 5, as represented by the four X's so that the customer can verify the number of digits of his PIN number that have been entered and, as instructed, presses the NO key if an entry error has been made.

Figure 6:
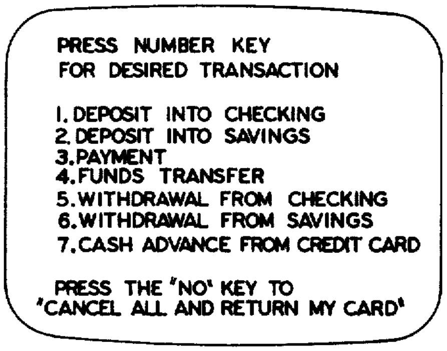

When the check is made in the unit 1 computer as to the validity of the card 3 and the validity of the related PIN number, which the customer has inserted as directed by the instruction of FIG. 5, the next message that may be displayed is shown in FIG. 6. The customer in accordance with the directions of the messages of FIG. 6, then presses a key for the desired transaction, such as the key 5 for WITHDRAWAL FROM CHECKING. The next message displayed at panel 5 may be that shown in FIG. 7 which desirably may display the customer's name as indicated at 21 and the amount of money desired to be withdrawn, such as $50.00, shown at 22. The customer, Mr. John Q. Public, in accordance with directions of FIG. 7, presses the YES button at keyboard 4 if the amount of money selected has been correctly keyed and displayed at 22 in FIG. 7; whereupon the message of FIG. 8 is displayed at display panel 5.

Figure 8:

At the time the message of FIG. 8 is displayed, the card originally inserted by the customer in the entry slot 2 is returned to the customer, and a receipt for the transaction is issued through the receipt slot 10.

Figure 9:

When the customer has received his card 3 and such receipt, the next message of FIG. 9 is displayed, which indicates to the customer that he should take the cash to be withdrawn from the door or drawer means 7. In this manner, a cash withdrawal transaction is completed.

As indicated in FIG. 6, instead of a Withdrawal From Checking, the instructions and procedure for which have just been described, any one of a number of other banking transactions may be carried out, such as 1. Deposit into checking
2. Deposit into savings
3. Payment
4. Funds transfer
6. Withdrawal from savings
7. Cash advance from credit card For each type of transaction, a series of instructive messages are displayed sequentially at the display panel 5. These messages are stored in the computer and are displayed through the operation of a character generator described. Each series of messages provides detailed instructions for the particular selected banking transaction. The transaction of PAYMENT, for example, may involve payment on credit card, utility or other accounts, or on mortgage or installment loans. Similarly, a FUNDS TRANSFER may involve transferring funds from one account to another.

The messages are stored in the computer and are displayed at display panel 5 through generation from a character generator, and thus may be varied or changed from time to time when desired, for example in connection with maintenance of the unit 1. Furthermore, the messages generated by the character generator may be alpha-numeric in character. Similarly, the messages may be bilingual for operation of the unit in remote areas where several languages may be spoken.

Figure 11:
FIG. 11 is a diagrammatic view illustrating that pictures, video tape messages, or other types of visual information may be displayed from time to time at the display panel.

The display panel means 5 desirably is a CRT or Video monitor connected by cable means with the character generator. Such display panel means 5 may also be interconnected with a cable connected to a source of video pictures. Such a picture is diagrammatically represented in FIG. 11. Alternatively, the output of a video tape may be supplied in a usual manner to the CRT monitor display panel means 5.

Figure 7:
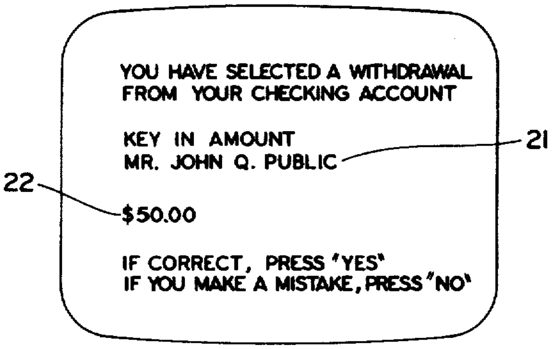

As previously described, since the unit 1 includes a card reader which reads a coded card such as the card 3, the name of the customer which may be contained in one of the magnetic stripes in area 16 may be read, and through programming through the character generator, the name may be displayed at the panel 5, as indicated in FIG. 7, so that the procedure of completing a banking transaction may be personalized.

In addition, as previously indicated, the amount of money, for example, that the customer desires to withdraw, and which the customer enters in the keyboard 4, may be displayed at the panel 5 as shown in FIG. 7, so that the customer's request may be verified and corrected, if incorrect keying has occurred.

Furthermore, other visual information, messages, pictures or the like of any nature may be displayed at the CRT monitor display panel means 5 in accordance with computer programming.

Figure 10:
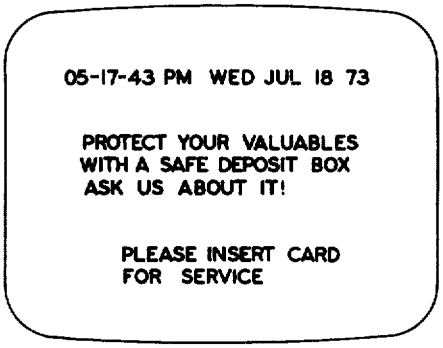
FIG. 10 is a view similar to FIG. 4 of another message that may be displayed or changed from time to time concerning banking services available.

For example, rather than the greeting message of FIG. 4, the message displayed at panel 5 may be changed from time to time to an advertising message, such as illustrated in FIG. 10.

Insofar as alpha-numeric messages are concerned, as indicated in FIGS. 4 through 10, these have been described as being displayed through the medium of a CRT monitor, because such equipment also lends itself to the display of pictures or to the output of video tape. However, where alpha-numeric messages only are to be displayed, the display panel means may comprise other forms of character display equipment, such as gas plasma means, for example. One type of programmable alpha-numeric message display equipment may comprise a plurality of gas-filled cells known in the art which can be turned on selectively to display a message, as described in U.S. Pat. No. 3,821,586.

The various components of the present concept of automatic banking equipment have been described in detail, as well as their integrated and related operation so that various automatic banking transactions can be carried out using any one of a number of types of known currency dispensers with modification to include programmable display means and manual entry keyboard for carrying out selected transactions. Also, as indicated, the remote unit may be one actuated by coded means which verifies the identity of the customer.

Accordingly, the concept of the invention provides new equipment which has maximum flexibility in operation and use and thus achieves the objectives stated, avoids difficulties that have been encountered and which have existed in the art, and solves problems and obtains the new results described.

In the foregoing description, certain terms have been used for brevity, clearness and understanding; but no unnecessary limitations are to be implied therefrom beyond the requirements of the prior art as such terms are used for descriptive purposes and are intended to be broadly construed.

Moreover, the description and illustration of the invention is by way of example, and the scope of the invention is not limited to the exact details shown or described.

Having now described the features and principles of the invention, the manner in which the new automatic banking equipment is constructed and operated, and the advantageous, new and useful results obtained; the new and useful structures, devices, components, elements, arrangements, parts, combinations, systems, equipment, operations and relationships are set forth in the appended claims.

We claim:

1. In automatic multiple-transaction banking equipment of a type in which a remote vault-like unit has manual entry keyboard means, card entry means, card reader means, cash dispenser and delivery means, and customer accessible cash drawer means; in which the unit is activated by the entry of coded card means into the card entry means and card reader means; in which the cash dispenser and delivery means is actuated by such coded card means and is operative to deliver to said cash drawer means a selected amount of cash determined by transaction data keyed in at the keyboard means by an authorized identified customer for removal by such customer whose identity has been verified and the transaction authorized by the entry of coded means into the unit; in which the coded means includes data contained on the coded card means and also customer verifying and transaction data keyed in at the keyboard means; and in which the coded card means has the identity of the customer encoded thereon; the combination of programmable display means including a single display panel, and means for selectively presenting at the single display panel one of a series of successive message instructions for a selected one of a plurality of different banking transactions which at least includes a cash dispensing transaction; the message instructions for any selected banking transaction comprising instructions to the customer for the entry of customer verifying and transaction data at the keyboard means to conduct the selected transaction; the programmable display means also including means for displaying at the single display panel concurrently with the display of banking transaction message instructions, the identity of the customer encoded on the coded card means and read by the card reader means; the programmable display means also including means for displaying at the single display panel at least portions of the transaction data keyed in at the keyboard means, concurrently with the display of at least certain of said banking transaction message instructions; whereby the concurrent display at the single display panel of banking transaction message instructions and certain transaction data permits customer errors to be detected and corrected.

2. Banking equipment as set forth in claim 1 in which customer verifying and transaction data keyed in at the unit keyboard means includes numeric entry of a selected amount of cash to be dispensed; and in which the numeric entry is displayed at the single display panel concurrently with the display of at least one of the transaction message instructions of the selected series.

3. Banking equipment as set forth in claim 2 in which the data keyed in at the unit keyboard means comprises alpha-numeric data.

4. Banking equipment as set forth in claim 1 in which visual information of a class consisting of pictures, and the output of video tape means is presented at the single display panel selectively alternately of the presentation of transaction message instructions at the single display panel.

5. Banking equipment as set forth in claim 4 in which the single display panel includes a CRT monitor.

6. Banking equipment as set forth in claim 1 in which the series of successive message instructions presented at the single display panel for transacting a selected one of a plurality of different banking transactions is selected from the group consisting of depositing, transferring funds from one account to another, withdrawing cash, and making credit card, utility, mortgage, or installment loan payments.

7. Banking equipment as set forth in claim 1 in which the message instructions presented at the single display panel includes bilingual instructions.

8. Banking equipment as set forth in claim 1 in which the display of the identity of the customer at the single display panel is accomplished by displaying the name of the customer read by the card reader means from the coded card means.

* * * * *